June 5, 1956 K. O. SISSON 2,748,585
DOMESTIC APPLIANCE
Filed Nov. 14, 1952 3 Sheets-Sheet 1

INVENTOR.
Kenneth O. Sisson
BY
Willits Hardman & Fehr
Attorneys

June 5, 1956 K. O. SISSON 2,748,585
DOMESTIC APPLIANCE
Filed Nov. 14, 1952 3 Sheets-Sheet 2

INVENTOR.
Kenneth O. Sisson
BY Willits Hardman & Fehr
Attorneys

June 5, 1956　　　K. O. SISSON　　　2,748,585
DOMESTIC APPLIANCE

Filed Nov. 14, 1952　　　3 Sheets-Sheet 3

INVENTOR.
Kenneth O. Sisson
BY
Willits, Hardman & Fehr
Attorneys

United States Patent Office 2,748,585
Patented June 5, 1956

2,748,585
DOMESTIC APPLIANCE

Kenneth O. Sisson, Dayton, Ohio, assignor to General Motors Corporation, Detroit, Mich., a corporation of Delaware Application November 14, 1952, Serial No. 320,598

7 Claims. (Cl. 68—12)

This invention relates to a domestic appliance and more particularly to automatic clothes washing machines and timers for such machines.

In clothes washing, certain fabrics such as cotton and linen can be washed in hot washing solutions while other fabrics such as wool, rayon, nylon, silk or cellulose acetate are damaged by such hot solutions and must be washed in warm or mixed water solutions. In the past it has been customary to provide a thermostatically controlled mixing valve arrangement for providing mixed water solutions.

It is an object of my invention to eliminate the thermostat control and to substitute an alternately operating switch arrangement which will alternately supply hot and cold water to provide a suitable mixed water solution at a satisfactory temperature.

These objects are attained in the form of an automatic washer and timing arrangement shown by connecting to one of the stationary contacts of the double throw selector switch, which controls the choice of hot or mixed water, and the contact which formerly connected to the thermostatically controlled mixing valve, to the movable contact of a double throw switch. This movable contact is operated by a cam also driven by the timer which alternately moves the movable contact between two stationary contacts. One of the stationary contacts is connected to the cold water supply valve while the other of these stationary contacts is connected to the hot water supply valve. By proportioning the cam surfaces the proportion of time which the movable contact is in contact with either of the contacts, the temperature of the water may be controlled within satisfactory limits.

Further objects and advantages of the present invention will be apparent from the following description, reference being had to the accompanying drawings wherein a preferred form of the invention is clearly shown.

In the drawings.

In both forms of timer the same reference characters are used for identical parts and only one description of these parts will be made since this description will apply to both.

Figure 1:
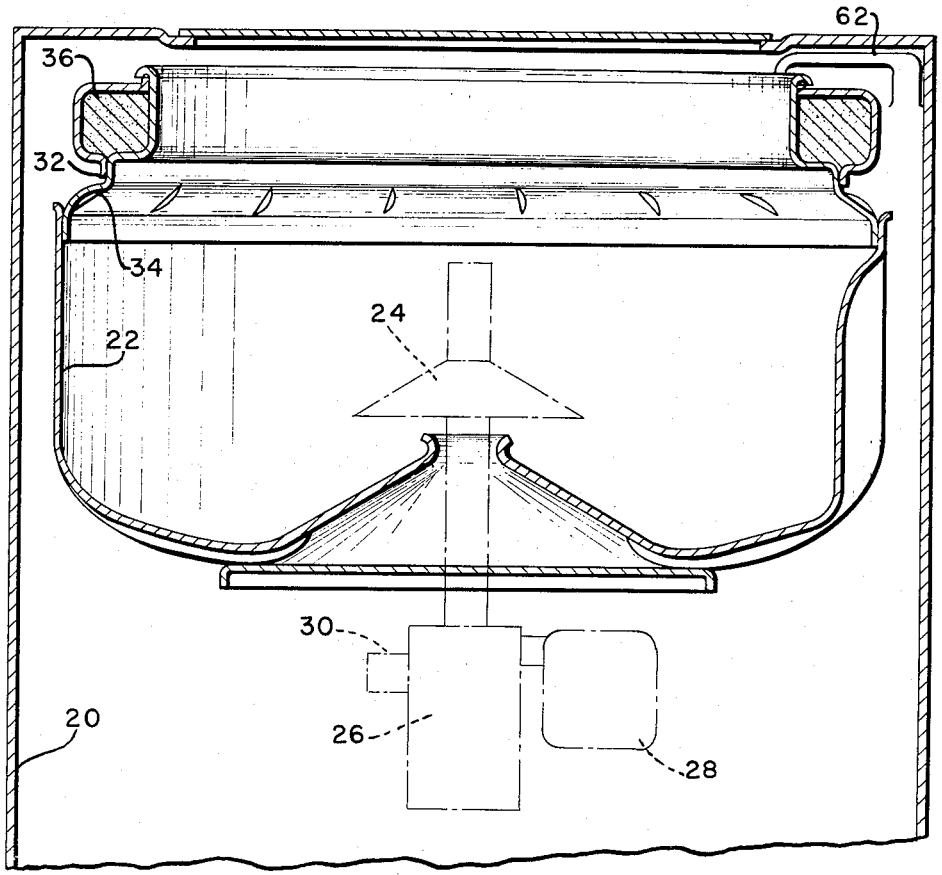
Figure 1 is a view of a washing machine partly diagrammatic embodying one form of my invention.

Referring now to the drawings and more particularly to Figure 1, there is shown a washing machine 20 provided with a tub 22 containing a vertical reciprocating type of agitator 24. The agitator 24 and the tub 22 are connected to a transmission 26 which in turn is connected to an electric driving motor 28. The transmission 26 is provided with a spin solenoid 30 shown on Figures 3 and 4. When this spin solenoid 30 is energized it causes the motor 28 to be connected to the tub 22 to spin the tub 22 for the purpose of centrifugally throwing the water out of the tub and drying the clothes. When the spin solenoid 30 is deenergized, the motor 28 is connected to the agitator 24 which is reciprocated to agitate the water and the clothes in the tub 22.

The tub 22 is provided with an inturned flange 32 extending inwardly at an angle of about 40° which is provided with a series of openings 34 extending entirely around the tub. When additional water is added to the tub near the end of the agitation period and near the end of the rinse period, the scum on the surface of the liquid will be floated through these openings 34 out of the tub. The inturned flange 32 is provided with a hollow ring-shaped container 36 which may be filled with lead shot or iron powder or other ballast material to serve as a fly-wheel to minimize vibration and oscillation during the spinning period.

Figure 3:
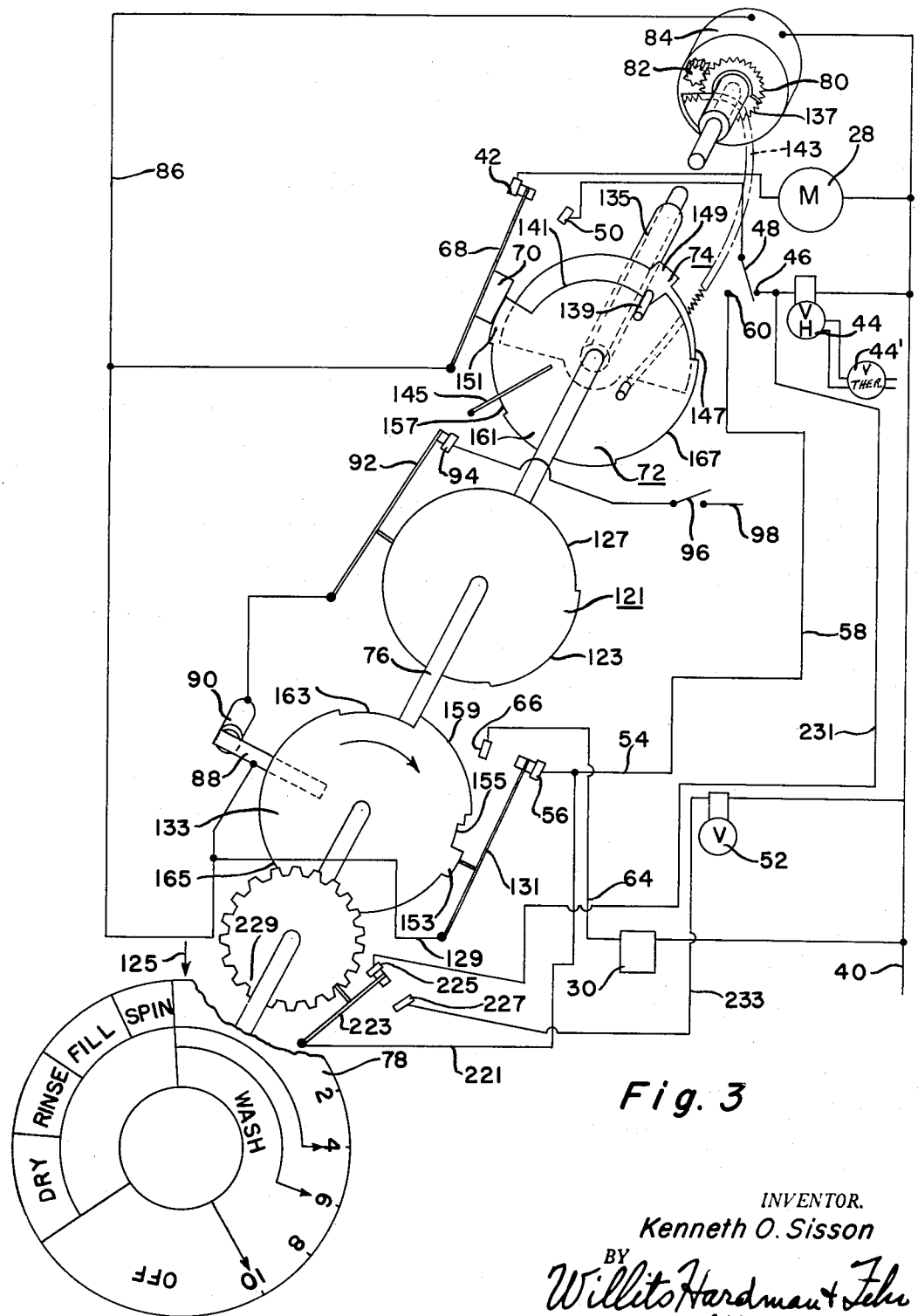
Figure 3 is a diagrammatic view of one form of timer embodying my invention.

One form of control system for this washer is shown in Figure 3 and includes the motor 28 having one terminal connected to the supply conductor 40 and the other terminal connected to a fixed contact 42. There is also provided a hot water solenoid valve 44 having one terminal connected to the supply conductor 40 and the second terminal connected to the one stationary contact 46 of a double throw selector switch 48. This hot water solenoid valve 44 is connected to a suitable source of thermostatically controlled hot water supply such as a thermostatically controlled water heater diagrammatically indicated by a thermostatically controlled valve 44'. The selector switch 48 has its movable contact connected to the stationary contact 50. It is also provided with a cold water supply solenoid valve 52 having one terminal connected to the supply conductor 40. These two valves 44 and 50 control the supply of hot and cold water to the filler spout 62 which discharges into the tub 22. The spin solenoid 30 has one terminal connected to the supply conductor 40 and the second terminal connected by the conductor 64 to the stationary contact 66.

The stationary switch contacts 42 and 50 connecting respectively to the motor 28 and the hot water solenoid valve 44, are adapted to be contacted by the double throw switch 68 provided with a cam follower 70 operated by cooperating cams 72 and 74. The cam 72 is fixed to a camshaft 76 upon the front end of which is fixed a dial knob 78 provided with legends indicating the various length of the agitation or wash periods as well as the spin, fill, rinse, dry and off periods. The opposite end of the camshaft 76 is connected to a gear 80 driven by a pinion 82 which is rotated at a predetermined speed by the timing motor 84 whenever the timing motor 84 is energized. This pinion 82 corresponds to the pinion 18 and the gear 80 corresponds to the gear 19 of the time switch shown in Figures 1 to 4 of the Hall Patent 2,313,064 issued March 9, 1943. The timing motor 84 corresponds to the timing motor 10 and the gear case and gear train 11 of said figures and to the pertinent portions of the specification of said patent.

One terminal of the timing motor 84 is connected to the supply conductor 40 while its second terminal is connected by the conductor 86 to a movable switch contact 88 closed when the dial knob 78 and the camshaft 76 are pushed rearwardly. This movable switch contact 88 is open when the dial knob 78 and the camshaft 76 are pulled forwardly. The movable contact 88 is adapted to engage and be disengaged from the stationary contact 90 which is connected directly to a cam operated switch member 92 cooperating with a stationary contact 94 which in turn is connected through a lid switch or safety switch 96 to the second supply conductor 98. The movable switch contact 92 is provided with a follower operated by the cam 121 fixed to the camshaft 76. This cam 121 is provided with a projection 123 for moving the switch 92 to the open circuit position during the off period of the dial knob 78. The legends on the dial knob 78 cooperate with the pointer 125 which points to the particular operation indicated on the dial which is in effect at the particular time. The cam 121 has a low portion 127 corresponding to the operating periods indicated on the dial knob 78 for closing the switch contact 92 during those periods.

The conductor 86 is also connected by the conductor 129 to the movable contact 131 of the double throw switch which operates between the stationary contacts 56 and 66. The contact 66 is electrically connected to one terminal of the spin solenoid 30 as previously indicated. The other stationary contact 56 is connected by the conductors 54 and 58 with the stationary contact 60 of the double throw selector switch 48 which provides a selection of either hot or mixed water for the first fill period. This double throw switch contact 131 is provided with a cam follower which engages the periphery of the rotatable cam 133 fixed to the camshaft 76. In addition, this cam 133 serves to operate the movable contact 88 to open and closed position whenever the camshaft 76 and the dial knob 78 are pulled forwardly or pushed rearwardly.

The cam 74 is fixed to the front end of a sleeve 135 which is rotatably mounted upon the camshaft 76 between the cam 72 and the gear 80. The rear end of the sleeve 135 is provided with a sector gear 137. When the dial knob 78 and the camshaft 76 are pushed in, this sector gear 137 is adapted to mesh with the pinion 82 when rotated to the proper angular position. This cam 74 is also provided with a pin 139 which projects into a deep arc notch 141 in the cam 72. The length of this notch 141 corresponds approximately with the length of the variable wash or agitation period indicated on the dial knob 78. When the dial knob 78 is pushed in, the pin 139 rotates freely with the camshaft 76. A coil spring 143 connects the sleeve 135 and the cam 72 in such a manner as to resiliently hold the sleeve 139 against the clockwise end of the notch 141.

When the dial knob 78 and the camshaft 76 are pulled forwardly in the off position and then rotated to the desired length of wash period, the pin 139 will engage a detent 145 which will stop the rotation of the floating cam 74 while the cam 72, the camshaft 76 and the dial knob 78 are rotated. The cam 74 is provided with a low portion 147 which is used to provide the fixed initial fill period. This low portion 147 is terminated by a high projecting portion 149 which constitutes the beginning of the agitation period. When the dial knob 78 is pulled forwardly in the off position and then rotated clockwise, the cam 74 and the pin 139 are pulled forwardly and then rotated until the pin 139 engages the detent 145 approximately when the indication 10 upon the wash period portion of the dial knob 78 is opposite the indicating arrow 125. The engagement of the pin 139 with the detent 145 prevents the movement of the sector gear 137 into engagement with the pinion 82 to permit independent rotation of the cam 72 and the gear 80. Rotation of the dial knob 78 to other wash periods as indicated by the numerals 2 to 8 on the dial knob 78, will not change the position of the cam 74 since it will be continued to be held in its same starting position by the engagement of the pin 139 with the detent 145. In this position the cam follower 70 will be resting upon the low portion 147 of the cam 74. Also in this position the sector gear 137 will be located adjacent to but out of mesh with the pinion 82 and slightly beyond and free of the end of the pinion 82.

When the dial knob 78 and the camshaft 76 are pushed in, the switch 88 will engage the stationary contact 90 to close the circuit from the supply conductor 98 through the switches 96, 92 and 88 and the conductor 86 to the timing motor 84 which has its second terminal directly connected to the supply conductor 40. This is indicated on the line marked timer in Figure 2. The pushing rearward of the dial knob 78 and the camshaft 76 also frees the pin 139 from the detent 145 and moves the first two of the sector gears 137 into engagement with the pinion 82 of the now energized timer motor 84. The follower 70 will be in engagement with the low portion 147 which will cause the contact 68 to move into contact with the contact 50 which will connect the conductor 86 through the switch 68 and its contact 50 to the movable contact member of the selector switch 48.

The selector switch 46 is provided so that during the initial fill period governed by the low portion 147 of the cam 74 can be employed to select an initial fill of either all hot water or mixed hot and cold water. When the movable contact 48 is in contact with the stationary contact, the hot water solenoid valve 44 will be energized and opened to supply hot water through the filler spout 62 as long as the low portion 147 is engaged by the cam follower 70.

When an initial fill of mixed hot and cold water is desired, the movable contact of the selector switch 48 is moved into engagement with the stationary contact 60. This stationary contact 60 is connected through the conductors 58, 54 and 221 with a double throw switch 223 having its movable contact operating between the stationary contacts 225 and 227. The double throw switch 223 is provided with a follower which rides upon the periphery of the toothed cam 229 which is fixed to the camshaft 76 between the cam 133 and the dial knob 78. The periphery of this cam 229 moves the movable contact of the double throw switch 223 alternately into and out of engagement with the two stationary contacts 225 throughout the rotation of the camshaft 76. However, if desired, the teeth of this cam 229 may be omitted during portions of the timer cycle during which there is no water filling.

The stationary contact 225 is connected by the conductor 231 with the same terminal of the hot water solenoid valve to which is connected the stationary contact 46. The stationary contact 227 is connected by the conductor 233 to the second conductor of the cold water solenoid valve 52. As a result of this, whenever the movable contact of the switch 68 is in engagement with the contact 50 and the movable contact 48 of the double throw selector switch 48 is in contact with the stationary contact 60 the double throw switch 223 will cause the valves 44 and 52 to be alternately energized to alternately open the valves 44 and 52 to alternately supply hot and cold water through the filler spout 62 to the tub 22. The teeth upon the cam 229 may have their width adjusted and their spacing adjusted so as to provide any desired proportion of open time for each of these valves.

The pinion 82 through the sector gear 137 and the sleeve 135 drives the cam 74. At the same time the pinion 82 through the gear 80 and the camshaft 76 drives the cams 72, 121 and 133 at the same speed of rotation as the cam 74. The sector gear 137 continues in driving engagement the pinion 82 throughout the initial fill period in which the low notch 147 is in engagement with the cam follower 70 and consequently the movable contact 68 is in engagement with the contact 50. The sector gear 137 continues in engagement with the pinion 82 until the high projection 149 engages and lifts up the follower 70 until the follower 70 rides upon the top of the projection 149. This will move the switch 68 out of engagement with the contact 50 (to stop the initial fill by deenergizing the hot water solenoid valve 44 or both solenoid valves 44 and 52) and into engagement with the stationary contact 42 which will energize the motor 28. The total length of time during which the hot water solenoid valve 44 or both valves 44 and 52 are energized is always the same and it determines the volume of initial fill of the tub 22. This time is always the same because the sector gear 137 drives the cam 74 the same distance at the start of every wash because the pin 139 and the detent 145 always locates the cam 74 in the same starting position.

The camshaft 76, however, is placed in a location which corresponds to the setting of the dial knob 78 when it is pushed rearwardly. The knob 78 may be pushed in when any of the legends 1½ to 10 of the wash period are opposite the indicating arrow 125. This will fix the location of the deep notch 141 of the cam 72 relative to the pin 139 and the cam 74. For a 10 minute wash period, the pin 139 will be in the clockwise end of the deep notch 141 as shown in Figure 3. For shorter wash periods, the notch 141 will be moved further clockwise relative to the pin 139. During the wash or agitation period the cam follower 70 rests upon the top of the high projection 149 until the projection 151 at the counterclockwise end of the deep notch 141 engages the pin 139. The cam follower 70 will then ride off the projection 149 onto the projection 151 and the agitation period continues. The energization of the motor 28 is indicated in Figure 2.

Figure 2:
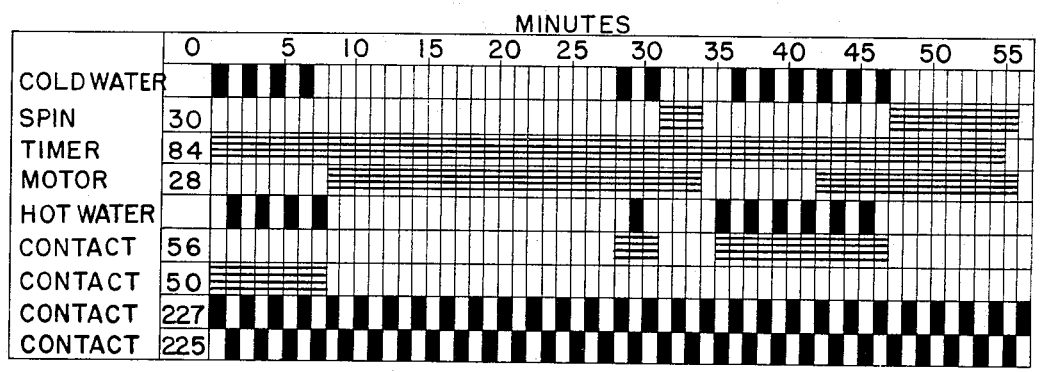
Figure 2 is a chart showing the operating and fill periods of various parts of the washing machine together with closed contact times of certain contacts.

As shown on the chart in Figure 2, there is indicated a mixed fill period at the end of 28 minutes which lasts for the last three minutes of the agitation or wash period. To provide this additional fill, a projection 153 is provided on the cam 133 which moves the switch contact member 131 into engagement with the stationary contact 56. This connects the contact 88 through the conductor 129, the switch 131, the stationary contact 56 through the conductor 221 with the double throw switch 223. This switch 223 alternately engages the contacts 225 and 227 to alternately energize and open the hot and cold water solenoid supply valves 44 and 52 to supply hot and cold water alternately to the tub 22 in sufficient amounts to cause the water to overflow the tub through the outlets 34. This overflow will carry off the scum on the surface of the water so that this scum will not be deposited on the clothes during the following spinning period.

When the end of the projection 153 is reached, the follower of the movable switch contact 131 will drop into the notch 155 thereby moving the movable contact 131 into engagement with the stationary contact 66 which connects through the conductor 64 with the spin solenoid 30. This is indicated in Figure 2. The energization of the spin solenoid 30 will connect the motor 28 through the transmission 26 with the tub 22 to cause the tub to rotate and centrifugally throw the water or washing solution out of the tub and out of the clothes through the openings 34 until substantially all of the water is removed. After this the follower 70 rides off of the projection 151 into the shallow notch 157 to move the switch contact member 68 to a position mid-way between the contacts 42 and 50 to deenergize the motor 28 as indicated in Figure 2. At the same time the follower of the switch 131 will move up by a step arrangement onto a high projection 159 which will move the movable contact 131 into engagement with the stationary contact 56. Through the alternate operation of the switch 223 this will alternately energize the cold water and hot water supply valves 44 and 52 to supply through the filler spout 62 a corresponding amount of hot and cold water to the tub 22 as indicated in the chart shown in Figure 2 from 35 to 47 minutes.

At 42 minutes when sufficient water has flowed into the tub, the projection 161 on the cam 72 engages the follower 70 to move the movable contact 68 into engagement with the stationary contact 42 to reenergize the motor 28 as indicated in Figure 2. Since the spin solenoid 30 is deenergized at this time, the motor 28 will be connected through the transmission 26 to the agitator 24 to agitate the clothes and the liquid in the tub 22. The alternate hot and cold water according to my invention will continue to flow into the tub as indicated in Figure 2 because of the length of the projection 159 until the water level rises above the level of the series of outlets 34 and overflows the tub 22 to float the remainder of the scum on the surface through the outlets 34. The agitation and the liquid flow continues until 47 minutes is reached.

When this is accomplished, the follower of the switch 131 drops into the notch 163 of the cam 133 to move the switch 131 into engagement with the contact 66 to energize the spin solenoid 30 as indicated in Figure 2. This will reconnect the motor 28 with the tub 22 and cause it to spin. This spinning continues sufficiently long to cause all of the water to be thrown out of the tub 22 and out of the clothes therein by centrifugal force so that when the follower of the switch 131 engages the end of the notch 163 the clothes will be substantially dry.

At the end of the notch 163 is provided a long projection 165 on the cam 133 which will hold the movable switch contact 131 in a position mid-way between the contacts 56 and 66. At the same time the follower 70 will ride off of the projection 161 onto the shallow notch 167 of the cam 62 which will hold the switch 68 in its mid position. Also at this time the projection 123 of the cam 121 will engage the follower of the switch 92 to move it to open position to deenergize the timer. At this time the dial knob 78 will have turned sufficiently far to bring its off position opposite the indicating arrow 125.

Figure 4:
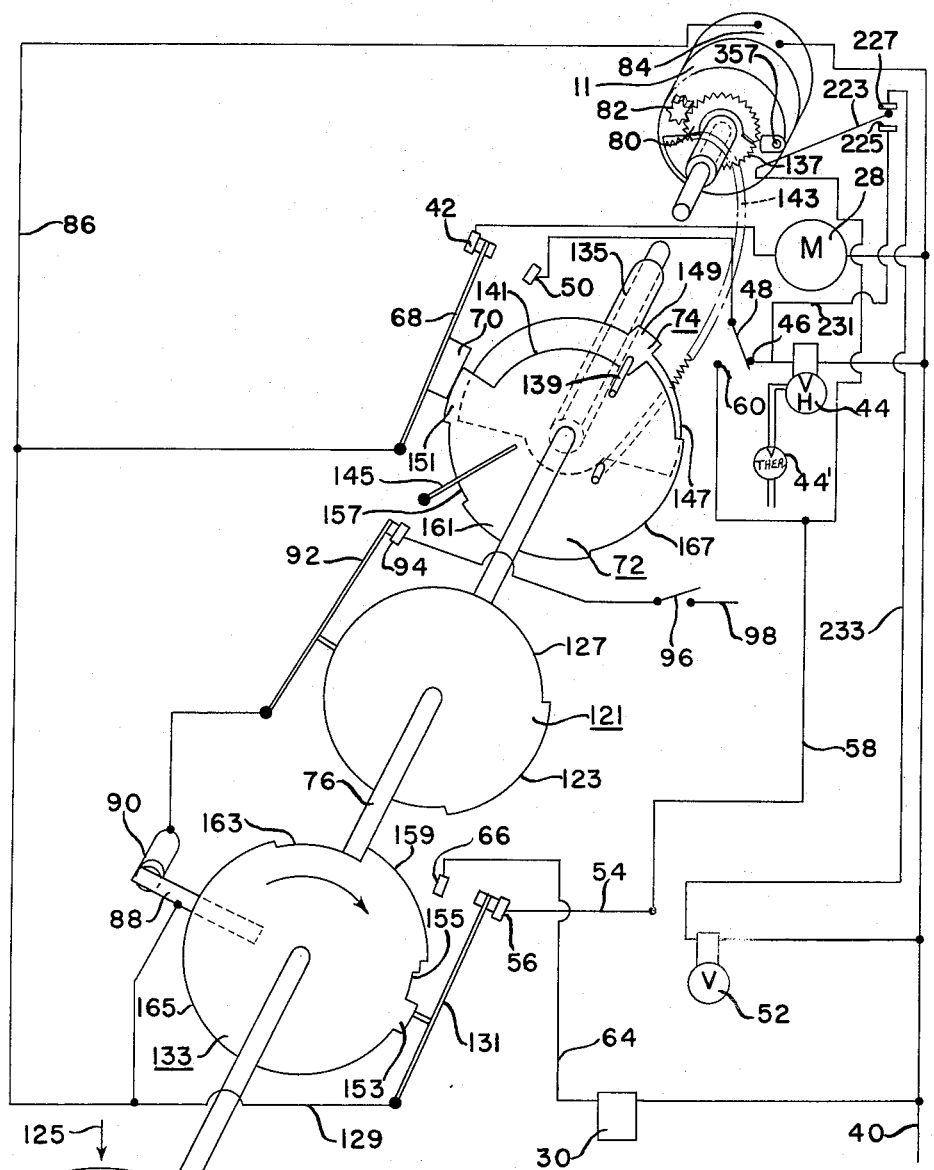
Figure 4 is a diagrammatic view of a modified form of timer embodying my invention.
Figure 4:
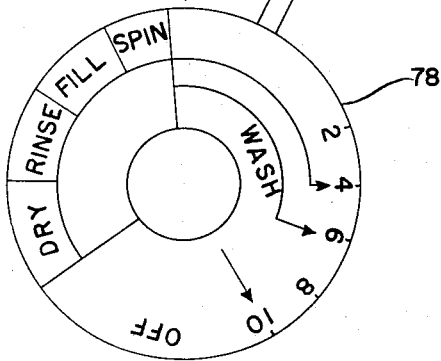

In Figure 4 there is provided a timer mechanism which is similar to the timer mechanism shown in Figures 6 to 8 of the Hall Patent 2,313,064. In this timer mechanism, which includes the motor 10 corresponding to the motor 84 in Figure 4, and a gear train 11 corresponding to the gear train 11 of this Hall patent, there is provided a camshaft 357 which corresponds to the camshaft 57 shown in Figures 6 to 8 of this Hall patent. This camshaft is provided with a cam 329 having a single lob which during one portion of each resolution each revolution moves the movable contact of the switch 223 into contact with the stationary contact 227 and in the other portion of each revolution moves the movable contact of this switch 223 into engagement with the stationary contact 225. The two parts of this cam 329 may be made of different lengths so as to differently proportion the time during which the movable contact of the switch 223 is in engagement with each of the stationary contacts. In this way the cam may be readily proportioned to give the desired temperature of the mixed water according to whatever temperature the hot water and the cold water supply may be. For example, if this timer is supplied to a region where the cold water supply is relatively warmer, then the cold water portion of the cam 329 will be made longer and the hot water portion shorter.

As set forth in the aforementioned Hall Patent 2,313,064, the pinion 82 may be either intermittently operated as in Figures 1 to 4 or it may be slowly continuously operated as in Figures 6 to 8. The cam 329 may be continuously operated at a more rapid rate than the camshaft 76 as in Figures 6 to 8 of said Hall patent. Except for the difference in the cams 229 and 329 and the method of driving these cams, the modifications of Figure 4 are identical to the modifications disclosed in Figure 3, and therefore, the remaining portion need not be separately described because all similar parts have the same reference characters applied to them.

While the form of embodiment of the invention as herein disclosed constitutes a preferred form, it is to be understood that other forms might be adopted as may come within the scope of the claims which follow.

What is claimed is as follows:

1. A washing machine including a clothes washing receptacle, a hot water supply and a cold water supply for said receptacle, an electrically operated agitating means for agitating the contents of said receptacle, means for causing the discharge of the liquid contents of said receptacle, electrically operated controls for individually controlling said hot and cold water supply, a timer having means for controlling said agitating means and said discharge means and the filling of said receptacle, said timer including a single cam and cam follower means for alternately opening said hot and cold water supply during each filling period of the receptacle, and means for rendering said single cam and cam follower means ineffective and for causing an entire fill period to be provided only by opening only one of said water supplies.

2. A washing machine including a clothes washing receptacle, a hot water supply and a cold water supply for said receptacle, an electrically operated agitating means for agitating the contents of said receptacle, electrically operated means for causing the discharge of the liquid contents of the receptacle, electrically operated valve means for controlling said hot water supply, electrically operated valve means for controlling said cold water supply, a timer having first means for operating said agitating means and said valve means, said timer also having second means for operating said electrically operated discharge means and said valve means, said timer also having third means effective during the operation of said valve means for alternately opening and closing said cold water and hot water valve means, and selective means for rendering said third means ineffective during the operation of said first means and causing the opening of the hot water valve means and the continuous closing of the cold water valve means.

3. A washing machine including a clothes washing receptacle, a hot water supply and a cold water supply for said receptacle, an electrically operated agitating means for agitating the contents of said receptacle, electrically operated means for causing the discharge of the liquid contents of the receptacle, electrically operated valve means for controlling said hot water supply, electrically operated valve means for controlling said cold water supply, a timer including a first cam means provided with a double throw switch follower and contact means, said timer also including a second cam means provided with a double throw switch follower and contact means, said agitating means being electrically connected to one of the stationary contacts associated with said first cam means, a double throw selector switch having its movable contact connected to the other stationary contact associated with said first cam means, one of the stationary contacts of said selector switch being electrically connected to said hot water valve means, said timer also including a third cam means provided with a double throw switch follower and contact means, electrical conductors connecting the other of the stationary contacts of the selector switch and one of the stationary contacts associated with the second cam means with the movable contact associated with the third cam means, one of the stationary contacts associated with said third cam means being electrically connected to said hot water valve means, the other of the stationary contacts associated with said third cam means being connected to said cold water valve means, the other stationary contact associated with said second cam means being electrically connected to said discharge means.

4. A timer including a drive means, first and second cam means, means for connecting said first and second cam means in different relationship to each other and to the drive means, a double throw selector switch means having a movable contact operating between two stationary contacts, a switch means operated by said first cam means electrically connected to the movable contact of said selector switch means, a third cam means driven by said drive means, a double throw switch means operated by said third cam means, a switch means operated by said second cam means, and electrical conductor means connecting one of the stationary contacts of said selector switch and the switch means operated by said second cam means with the movable contact of the switch means operated by said third cam means.

5. A washing machine including a clothes washing receptacle, a hot water supply and a cold water supply for said receptacle, an electrically operated agitating means for agitating the contents of said receptacle, electrically operated means for causing the discharge of the liquid contents of the receptacle, electrically operated valve means for controlling said hot water supply, electrically operated valve means for controlling said cold water supply, a sequential timer having a plurality of switch means and a means for opening and closing said switch means at various times in a predetermined sequence, electrical connections connecting one of said switch means with said agitating means, electrical connections connecting a second of said switch means with the discharge means, a double throw switch means having alternate electrical connections, electrical connections connecting said alternate connections with said hot water and cold water valve means, said timer having means for alternately moving said double throw switch means from one alternate connection to another frequently, and electrical connections connecting a third of said sequentially operating switch means to said double throw switch means.

6. A timer including a drive means, first and second cam means, a switch means operated by said first cam means, a third cam means driven by said drive means, a double throw switch means operated by said third cam means, a switch means operated by said second cam means, and electrical conductor means connecting said switch means operated by said second cam means to the movable contact of said double throw switch means, said third cam means having means for alternately moving said double throw switch means from one position to another.

7. A timer including a drive means, first and second cam means, a switch means operated by said first cam means, a third cam means driven by said drive means, a double throw switch means operated by said third cam means, a switch means operated by said second cam means, and electrical conductor means connecting said switch means operated by said first and second cam means to the movable contact of said double throw switch means, said third cam means having means for alternately moving said double throw switch means from one position to another.

References Cited in the file of this patent

UNITED STATES PATENTS

| | | |
|---|---|---|
| 2,486,668 | Miller | Nov. 1, 1945 |
| 2,503,901 | Chace | Apr. 11, 1950 |
| 2,526,444 | Woodson | Oct. 17, 1950 |
| 2,549,025 | Sisson | Apr. 17, 1951 |
| 2,561,348 | Dunham | July 24, 1951 |